United States Patent
Huber et al.

(10) Patent No.: US 8,120,276 B2
(45) Date of Patent: Feb. 21, 2012

(54) LIGHT SOURCE EMITTING MIXED-COLORED LIGHT AND METHOD FOR CONTROLLING THE COLOR LOCUS OF SUCH A LIGHT SOURCE

(75) Inventors: Andreas Huber, Maisach (DE); Peter Niedermeier, München (DE); Oskar Schallmoser, Ottobrunn (DE)

(73) Assignee: Osram AG, Munich (DE)

( * ) Notice: Subject to any disclaimer, the term of this patent is extended or adjusted under 35 U.S.C. 154(b) by 716 days.

(21) Appl. No.: 12/083,630

(22) PCT Filed: Oct. 12, 2006

(86) PCT No.: PCT/EP2006/067353
§ 371 (c)(1),
(2), (4) Date: Oct. 22, 2008

(87) PCT Pub. No.: WO2007/045601
PCT Pub. Date: Apr. 26, 2007

(65) Prior Publication Data
US 2010/0134037 A1    Jun. 3, 2010

(30) Foreign Application Priority Data
Oct. 17, 2005 (DE) .................. 10 2005 049 579

(51) Int. Cl.
*G05F 1/00* (2006.01)
(52) U.S. Cl. ........ 315/294; 315/307; 315/194; 315/360; 315/312; 345/102; 345/83
(58) Field of Classification Search .................. 315/291, 315/307, 249, 154, 155, 312, 224, 194, 294, 315/360; 362/230, 231, 227, 555, 611–613, 362/97.1–97.4, 800; 345/82–84, 94, 102, 345/207, 204, 690
See application file for complete search history.

(56) References Cited

U.S. PATENT DOCUMENTS

| | | | |
|---|---|---|---|
| 6,392,358 B1 | 5/2002 | Runau et al. | |
| 6,441,558 B1 | 8/2002 | Muthu et al. | |
| 6,495,964 B1 | 12/2002 | Muthu et al. | |
| 7,173,384 B2 * | 2/2007 | Plotz et al. .................... | 315/291 |
| 7,467,885 B2 * | 12/2008 | Grotsch et al. ............... | 362/555 |
| 7,510,300 B2 | 3/2009 | Iwauchi et al. | |
| 7,878,681 B2 * | 2/2011 | Blumel et al. ................ | 362/231 |
| 7,942,562 B2 * | 5/2011 | Hatzenbuehler et al. ..... | 362/555 |
| 7,952,784 B2 * | 5/2011 | Steffen et al. ................ | 359/238 |
| 2002/0047624 A1 | 4/2002 | Stam et al. | |
| 2002/0097000 A1 | 7/2002 | Muthu et al. | |
| 2003/0006945 A1 | 1/2003 | Lim et al. | |
| 2004/0036418 A1 | 2/2004 | Rooke et al. | |

FOREIGN PATENT DOCUMENTS
CN     1419797 A     5/2003
(Continued)

*Primary Examiner* — Haiss Philogene (57) ABSTRACT

A light source (10) is disclosed, emitting multi-colored light with light of at least two different colors, emitted from a number of primary light sources (1) wherein the primary light sources (1) are divided into groups and the brightness values of the primary light sources (1) within a group are determined and controlled separately according to color, such that the color location of the multi-colored light lies in a given region of the CIE standard color diagram. The invention further relates to a method for controlling such a light source (10) and an illumination device with such a light source (10), for example, for backlighting a display.

21 Claims, 5 Drawing Sheets

FOREIGN PATENT DOCUMENTS

| | | |
|---|---|---|
| JP | 2002533870 T | 10/2002 |
| JP | 2002344696 A | 11/2002 |
| JP | 200429141 A | 1/2004 |
| JP | 2004509431 T | 3/2004 |
| WO | 0223954 A1 | 3/2002 |
| WO | 02/052902 A2 | 7/2002 |
| WO | 03075617 A1 | 9/2003 |

* cited by examiner

LIGHT SOURCE EMITTING MIXED-COLORED LIGHT AND METHOD FOR CONTROLLING THE COLOR LOCUS OF SUCH A LIGHT SOURCE

SUMMARY

Background

The invention relates to a light source emitting mixed-colored light and a method for controlling the color locus thereof, and an illumination device for backlighting a display comprising a light source emitting mixed-colored light.

BRIEF DESCRIPTION

The color locus of light sources emitting mixed-colored light of different colors from primary light sources, for instance light emitting diodes, is often subject to fluctuations, for example on account of ageing processes of the primary light sources or external influences, such as temperature fluctuations. For some applications, for example for backlighting displays, it is desirable, however, for the color locus of the light source to remain substantially constant, independently of changes in the light from the primary light sources.

One object of the present invention is to specify a light source and an illumination device for backlighting a display, emitting mixed-colored light whose color locus can be controlled in a simple manner. A further object of the invention is to specify a method for controlling the color locus of a light source emitting mixed-colored light.

These objects are achieved by means of a method comprising the steps of patent claim 1, by means of a light source comprising the features of patent claim 13, and by means of an illumination device comprising the features of patent claim 21.

Advantageous embodiments and developments of the light source and of the method are respectively specified in the dependent claims.

In a light source emitting mixed-colored light containing light of at least two different colors which is emitted by a plurality of primary light sources the primary light sources are divided into groups, wherein the brightness values of the primary light sources within a groups are determined and controlled separately according to colors, such that the color locus of the mixed-colored light lies in a predetermined region of the CIE standard chromaticity diagram.

In this case, the primary light sources can be divided into groups either such that a group comprises only primary light sources of a single color, or alternatively such that a group comprises primary light sources of different colors.

Preferably, the primary light sources of a group are in each case selected with respect to one another such that the brightness values of their light are within a predetermined range.

Since the primary light sources are divided into groups whose brightnesses lie within a predetermined range, only the primary light sources within a group have to be determined and controlled for controlling the color locus of the mixed-colored light. Compared with controlling each individual primary light source, the control complexity can thus be reduced. Compared with the possibility of using only primary light sources that are selected with respect to one another, the use of groups of primary light sources that are selected with respect to one another affords the advantage that in each case a smaller number of primary light sources have to be selected with respect to one another, whereby the costs can advantageously be reduced. This last has a positive effect particularly in the case of light sources having a large number of primary light sources.

Particularly preferably, the brightness values of the light of the primary light sources of a group are in one of the following ranges, the limits being included in each case: between 24000 mlm and 28000 mlm, between 28000 mlm and 33000 mlm, between 33000 mlm and 39000 mlm, between 39000 mlm and 45000 mlm, between 45000 mlm and 52000 mlm, between 52000 mlm and 61000 mlm, between 61000 mlm and 71000 mlm.

Preferably, the predetermined range of the brightness values of a group comprises 4000 mlm, 5000 mlm, 6000 mlm, 7000 mlm, 8000 mlm, 9000 mlm or 10000 mlm from its minimum to its maximum.

In one preferred embodiment, the primary light sources of a color within a group are furthermore selected with respect to one another such that the dominant wavelengths of their light likewise lie within a predetermined range. Preferably, the predetermined range for the dominant wavelengths comprises 4 nm, 5 nm or 10 nm from its minimum to its maximum.

In the context of the present invention, dominant wavelength of the primary light is understood to mean the wavelength of monochromatic radiation which brings about the same color impression for the human eye as the light from the primary light source.

As an alternative or in addition to selection according to dominant wavelengths, the primary light sources of a group can also be selected according to peak wavelengths, such that the peak wavelengths of the primary light sources within a group lie within a predetermined range.

The use of primary light sources with selected dominant wavelength and/or selected peak wavelength within a group furthermore advantageously contributes to being able to control the color locus of the mixed-colored light in a simple manner.

In one preferred embodiment, the light source emits mixed-colored light comprising red, green and blue light. Since these three colors span a large region within the CIE standard chromaticity diagram, the color locus of the mixed-colored light can be set in a wide range by varying the brightness of said sources.

In this embodiment, the dominant wavelengths of the primary light sources of a group which emit the red light preferably lie within one of the following ranges, the limits being included in each case: between 612 nm and 615 nm, between 616 nm and 620 nm, between 620 nm and 624 nm. The dominant wavelengths of the primary light source of a group which emit the green light furthermore preferably lie, in this embodiment, within one of the following ranges, the limits once again being included: between 519 nm and 525 nm, between 525 nm and 531 nm, between 531 nm and 537 nm. The dominant wavelengths of the primary light sources which emit the blue light furthermore preferably lie, in this embodiment, within one of the following ranges, once again the limits being included: between 449 nm and 453 nm, between 453 nm and 457 nm, between 457 nm and 461 nm, between 464 nm and 468 nm, between 468 nm and 472 nm, between 472 nm and 476 nm.

Particularly preferably, the predetermined region of the color locus of the mixed-colored light lies in the white region of the CIE standard chromaticity diagram. On the one hand, white light in particular light which is similar to sunlight, is necessary for many applications. On the other hand, the human eye is particularly sensitive to color changes in the case of white light, which necessitates control of the color locus particularly frequently.

Preferably, the light source has semiconductor light emitting diodes (LEDs), organic light emitting diodes (OLEDs), lasers, in particular semiconductor lasers, or electroluminescent films as primary light sources.

These primary light sources have the advantage that their brightness, in comparison with other light sources, such as incandescent lamps for example, can be changed with a small time delay by varying the electrical signal with which they are driven. Furthermore, they are advantageously suitable for driving with pulse-width-modulated signals.

A pulse-width-modulated signal (PWM signal) is an electrical signal, preferably a rectangular signal, which, within a fixed basic period T, is switched on for a specific time $t_{on}$ and is switched off for the remaining duration of the basic period $t_{off}$. The ratio of switch-on time and basic period $t_{on}/T=t_{on}/(t_{on}+t_{off})$ is referred to as duty ratio dc. The duty ratio is a measure of the percentage time proportion during which the PWM signal is switched on within the basic period T.

For driving the primary light sources of a color within a group, a respective modified PWM signal is preferably used which has a modified basic period with a first time interval $t_1$ in addition to the time intervals $t_{on}$ and $t_{off}$, where $t_1$ may perfectly well be included in one of the time intervals $t_{on}$ or $t_{off}$ or overlaps one of said time intervals. Furthermore, the basic periods of the modified PWM signals for driving the primary light sources of a color within a group have a fixed phase relationship with respect to one another; particularly preferably, the value of the phase between the modified basic periods is zero. The time interval $t_1$ is furthermore preferably situated at the beginning of the modified basic period. Furthermore, the time interval $t_1$ can be provided as a measurement time period for determining brightness values of the light of the individual colors or of the background. For determining the brightness value of the light of a color within a group the time interval $t_{on}$ of the corresponding modified PWM signal is phase-shifted such that it begins simultaneously with the time interval $t_1$, while the time intervals $t_{on}$ of the modified PWM signals for driving the primary light sources of colors of a group whose brightness values are not intended to be determined lie outside the time interval $t_{on}$. Thus, the brightness of the primary light sources of a color within a group can be determined within the time interval $t_{on}$. In particular, a sensor which does not distinguish according to colors, such as a photodiode for example, can advantageously be used for this purpose.

In one preferred embodiment, the phase shift of the time internal $t_{on}$ into the time interval $t_1$ does not take place abruptly between two directly successive modified basic periods, but rather slowly, such that the beginning of the time interval $t_{on}$ is congruent with the beginning of the time interval $t_1$ only after a plurality of modified basic periods have elapsed.

Furthermore, the phase shift of the time interval $t_1$ into the time interval $t_1$ is preferably carried out at a constant duty ratio since, advantageously, no change in the color locus of the mixed-colored light then takes place on account of a change in the duty ratio.

The modified PWM signals permit the brightness values of the primary light sources of a color within a group to be determined sequentially, that is to say in, not necessarily directly, successively proceeding modified basic periods during the time interval $t_1$. The above-described modified PWM signals for driving the primary light sources of different colors succeed one another for this purpose.

A sequence of different modified basic periods is referred to hereinafter as the total period of the PWM signal, combining the modified basic periods of the PWM signals for driving the primary light sources of a group in such a way that the total period is periodically repeated uniformly.

The total period of the PWM signal likewise preferably comprises a time interval in which no primary light source of a group is switched on. The brightness value of the background can be determined within this time interval. Preferably, the time interval $t_1$ is likewise used for this purpose, none of the time intervals $t_1$ being phase-shifted into the time interval $t_1$.

If the values of the background brightness are determined, then the brightness values of the primary light sources can advantageously be corrected by the background brightness, such that disturbances for example as a result of ambient light or component offset can be at least partially compensated for. The correction of the brightness values by the background brightness can be effected for example by subtracting the brightness value of the background from the brightness values of the light of the primary light sources of a color within a group.

In one embodiment, the modified PWM signals for driving the primary light sources of the light source are configured such that only the primary light sources of a color of a single group are ever switched on in each case.

In a further preferred embodiment, the brightness values are determined by means of a sensor, the sensitivity of which is adapted to the sensitivity of the human eye.

In one embodiment, the light source comprises communication elements suitable for exchanging information, such as the signal of the sensor for example, between the individual groups. Furthermore, the communication elements can be used to define the order in which the brightness values of different groups are determined.

The light source is suitable in particular for being used for an illumination device for backlighting a display, for example an LCD display.

In one preferred embodiment of the illumination device for a display, the frequency 1/T corresponding to the basic period T of the modified PWM signals is synchronized with the line frequency or a multiple of the line frequency.

BRIEF DESCRIPTION OF THE DRAWINGS

Further advantages and advantageous embodiments of the invention will become apparent from the exemplary embodiments explained in more detail below in conjunction with FIGS. 1A, 1B, 2 to 3 and 4A to 4C.

In the figures.

DETAILED DESCRIPTION

In the exemplary embodiments and figures, identical or identically acting constituent parts are in each case provided with the same reference symbols. The illustrated elements of the figures should not be regarded as true to scale, in principle. Rather, they may be illustrated in part with an exaggerated size, for example, in order to afford a better understanding.

Figure 1A:
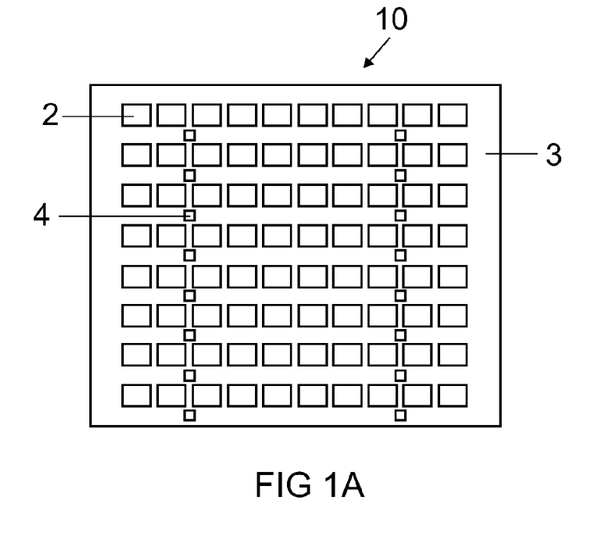
FIG. 1A shows a schematic plan view of a light source in accordance with one exemplary embodiment.
Figure 1B:
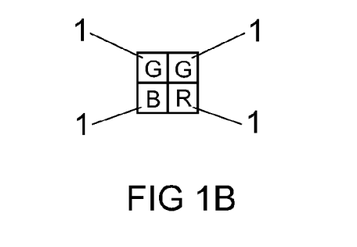
FIG. 1B shows a schematic plan view of a module with primary light sources in accordance with one exemplary embodiment.

In the light source 10 in accordance with the exemplary embodiment of FIG. 1A, a plurality of semiconductor light emitting diodes 1 (LEDs) emitting light of different colors are used as primary light sources. In the present case, for example two LEDs 1 emitting green light (referred to hereinafter for short as "green LED" G), one LED emitting blue light (referred to hereinafter for short as "blue LED" B), and one LED emitting red light (referred to hereinafter for short as "red LED" R) are respectively combined in a module 2. A schematic plan view of such a module 2 is shown in FIG. 1B. In the exemplary embodiment in accordance with FIG. 1A, ten of said modules 2 in each case are arranged equidistantly in a series, the LEDs 1 of a series forming a group. This means that the LEDs 1 of a series are selected in accordance with their brightness such that their brightness values lie within a predetermined range. Furthermore, the LEDs 1 of a group and a color R, G, B can in each case also be selected in accordance with their dominant wavelength, that is to say that the dominant wavelengths of the green LEDs G of a group, the dominant wavelengths of the red LEDs R of a group and the dominant wavelengths of the blue LEDs B of a group lie within a predetermined range.

The light source 10 in accordance with FIG. 1A has a plurality of series of modules 2 which are arranged one below another and mounted on a carrier 3. Between the series of modules 2, there is situated in each case between the second and third module 2 at the beginning and end of each series a sensor 4, for example a photodiode, which detect the brightness values of the primary light sources within the group and also the background brightness. As an alternative to photodiodes, it is also possible to use sensors having a sensitivity adapted to the sensitivity of the human eye.

Figure 2:
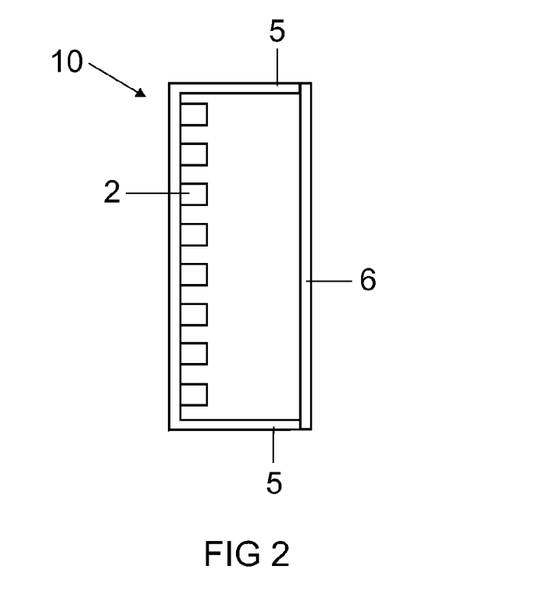
FIG. 2 shows a schematic sectional illustration through an illumination device in accordance with one exemplary embodiment.

FIG. 2 shows a schematic sectional illustration through an illumination device comprising a light source 10 as illustrated for example in FIG. 1A. Furthermore, the illumination device comprises side walls 5 and a light-scattering plate 6, for example an opal glass sheet or a diffusely scattering plastic plate, which forms the front side of the illumination device, from which the mixed-colored light of the illumination device is emitted.

Figure 3:
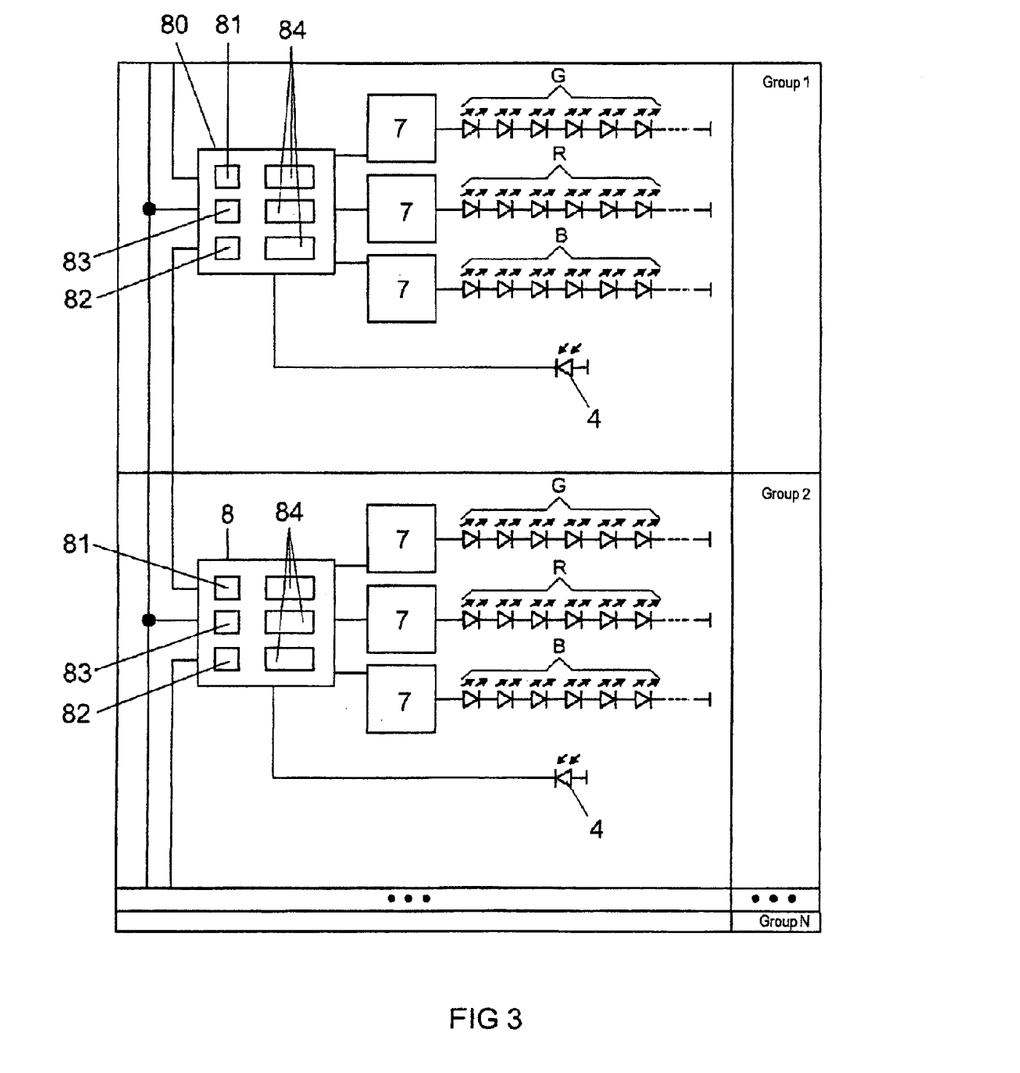
FIG. 3 shows a schematic illustration of a block diagram for the control of a light source in accordance with one exemplary embodiment.

The light source 10 in accordance with FIG. 1A can be driven for example with the aid of a circuit whose block diagram is shown schematically in FIG. 3. The block diagram shows by way of example the circuit of two groups, group 1 and group 2, which can be extended in an equivalent manner for a larger number N of groups. The LEDs 1 of a group which emit light of one color are in each case connected in series. In the present case, the red LEDs R of a group, the green LEDs G of a group and the blue LEDs B of a group are connected in series. A respective series connection of LEDs of one color are supplied with current by a constant-current source (linear or clocked) 7. Furthermore, the circuit in accordance with the block diagram of FIG. 3 comprises per group a control component 8 comprising two subunits for communication 81, 82 with the control component 8 of another group, one subunit for internal synchronization 83 and one for each color of the mixed-colored light, that is to say in the present case three, subunits for generating PWM signals 84. Furthermore, the control component 8 has an input for the signal of the sensor 4.

Each constant-current source 7 is driven by a subunit for generating PWM signals 84, while a respective subunit of one group for internal communication 81 is connected to a subunit for internal communication of another group 82. Furthermore, the subunits for internal synchronization 83 of the two groups illustrated are connected to one another.

Figure 4A:
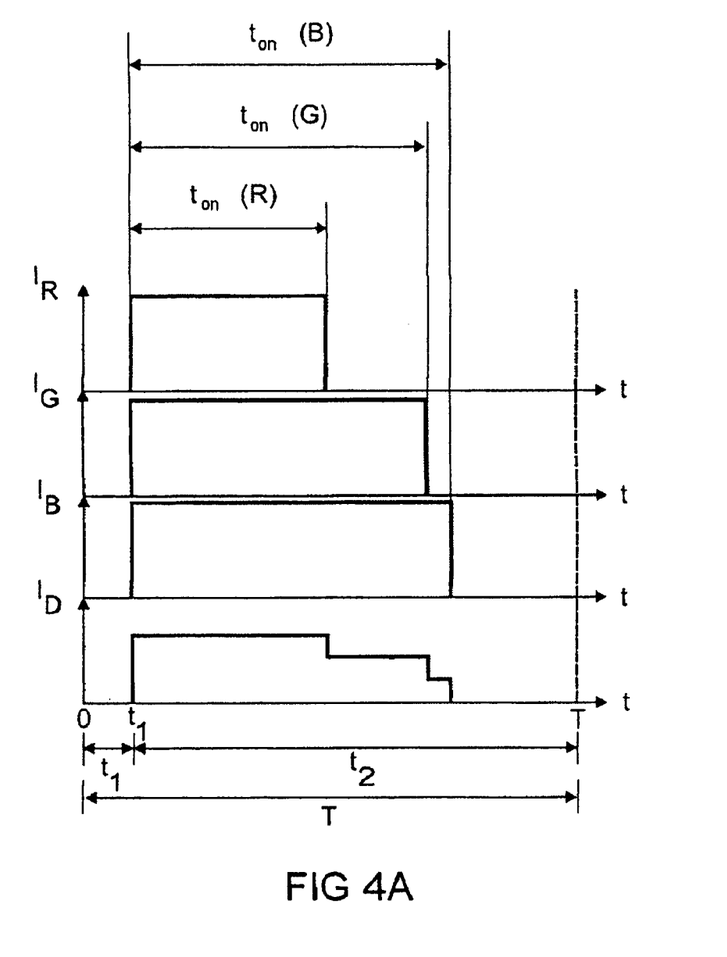
FIG. 4A shows a schematic illustration of a modified basic period of electrical PWM signals in accordance with one exemplary embodiment.

FIG. 4A schematically shows in each case a basic period T of modified PWM signals $I_R$, $I_G$, $I_B$ for driving the red, green and blue LEDs R, G, B of a group, and also the signal of the sensor $I_D$ during said basic period T. The basic period T of a modified PWM signal $I_R$, $I_G$, $I_B$ is split into a time interval $t_1$ and a time interval $t_2$. The time interval $t_1$ is provided for carrying out measurements with the sensor 4 and reading the latter. The time interval $t_2$ represents the time period within which the LEDs of one color R, G, B per group can be switched on, while the time interval $t_{on}$ specifies the actual duration for which they are switched on. The basic periods of the three modified PWM signals for driving the red, green and blue LEDs R, G, B in accordance with FIG. 4A have no phase shift with respect to one another. Furthermore, none of the PWM signals is switched on within the time interval $t_1$. The signal of the sensor $I_D$ during this time interval is a measure of the brightness value of the background.

Figure 4B:
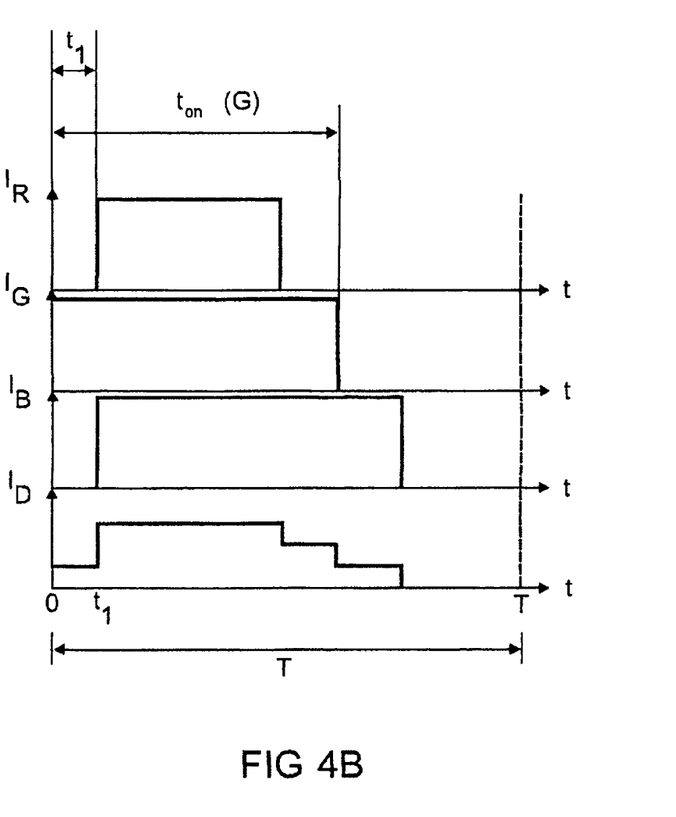
FIG. 4B shows further schematic illustrations of a modified basic period of electrical PWM signals for controlling the light source in accordance with one exemplary embodiment.

FIG. 4B likewise illustrates in each case a basic period T of modified PWM signals $I_R$, $I_G$, $I_B$ for driving the red, green and blue LEDs R, G, B of a group, in which case, in contrast to FIG. 4A, the time interval $t_{on}$ of the PWM signal for driving the green LEDs $I_G$ of a group is phase-shifted in such a way that the beginning of the time interval $t_{on}$ (G) is congruent with the beginning of the time interval $t_1$. Therefore, the signal of the sensor $I_D$ during the time interval $t_1$ is a measure of the brightness of the green LEDs G of said group. In this case, the phase shift of the time interval $t_{on}$ preferably does not take place completely between two directly successive basic periods T, but rather slowly. The frequency 1/T corresponding to the basic period T is 260 Hz, for example, and the phase shift is approximately 10°/s, for example.

As described above by way of example with reference to FIG. 4B for the light of the green LEDs G of a group, the brightnesses of the red and blue LEDs R and B of a group can also be determined by the time intervals $t_{on}$ of the respective PWM signals $I_R$, $I_G$, $I_B$ being phase-shifted such that their beginning is congruent with the beginning of the time interval $t_1$.

Figure 4C:
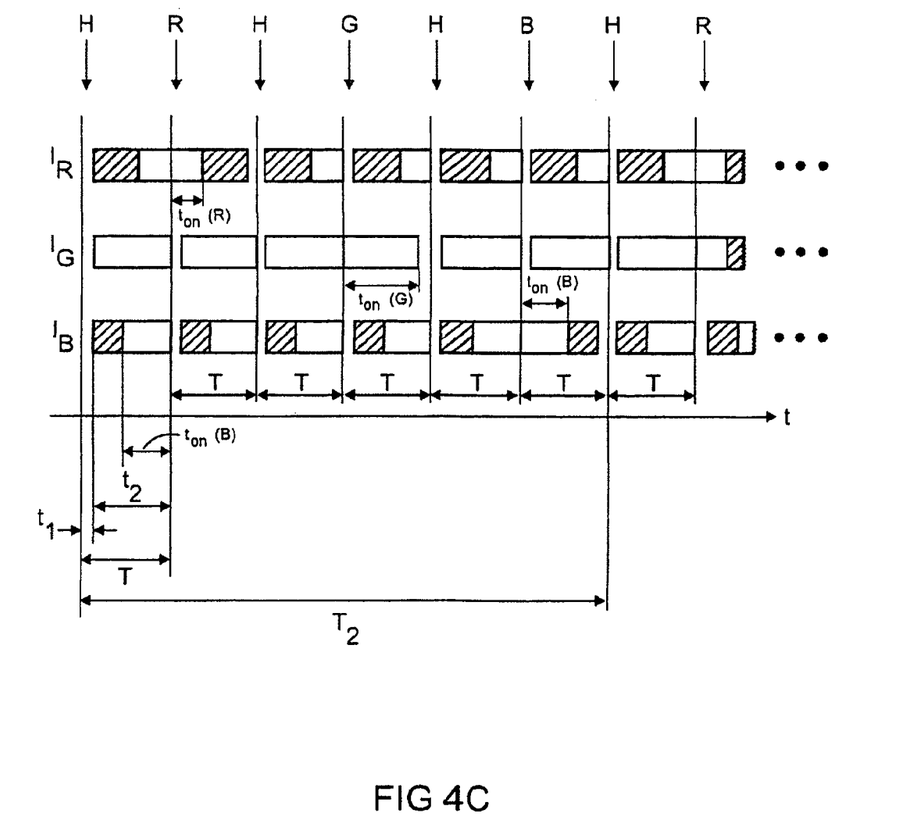
FIG. 4C shows a sequence of basic periods of electrical PWM signals for controlling the light source in accordance with one exemplary embodiment.

FIG. 4C shows a further exemplary embodiment of modified PWM signals $I_R$, $I_G$, $I_B$ for driving the red, green and blue LEDs R, G, B of a group, in which case, in contrast to FIGS. 4A and 4B, a plurality of modified basic periods T which form a total period $t_2$ are illustrated. The total period $t_2$ of the modified PWM signals $I_R$, $I_G$, $I_B$ in FIG. 4C is composed of six successive basic periods T. During the first basic period T, none of the time intervals $t_{on}$ is phase-shifted into the time interval $t_1$, such that the background brightness can be determined (symbolized by H in the diagram). During the second basic period T, the time interval $t_{on}(R)$ of the modified PWM signal $I_R$ for driving the red LEDs R of a group that is phase-shifted in such a way that the beginning of the time interval $t_{on}$ (R) is congruent with the beginning of the time interval $t_1$, such that the signal of the sensor $I_D$ (not illustrated in FIG. 4C) during the time interval $t_1$ is a measure of the brightness values of the red LEDs R of a group. The third basic period T is identical to the first basic period T, while during the fourth basic period T the time interval $t_{on}(G)$ of the modified PWM signal $I_G$ for driving the green LEDs G of a group is phase-shifted in such a way that the beginning of the time interval $t_{on}(G)$ is congruent with the beginning of the time interval $t_1$, such that the signal of the sensor $I_D$ during the time interval $t_1$ is a measure of the brightness values of the green LEDs G of a group. The fifth basic period T is once again identical to the first and the third basic period T and can be used for example for determining the background brightness. During the sixth basic period T, the time interval $t_{on}(B)$ of the modified PWM signal $I_R$ for driving the blue LEDs B of a group is phase-shifted in such a way that the beginning of the time interval $t_{on}(B)$ is congruent with the beginning of the time interval $t_1$ such that the signal of the sensor $I_D$ during the time interval $t_1$ is a measure of the brightness values of the blue LEDs B of a group.

FIG. 4C illustrates for the sake of simplicity only the basic periods T during which brightness values, either of the background or of the LEDs R, G, B, can be determined, such that the phase shift of the time interval $t_{on}$ into the time interval $t_1$ is represented in each case abruptly between two directly successive basic periods T. If the phase shift of the time interval $t_1$ takes place slowly, however, then further basic periods T are situated between two of the basic periods T illustrated in FIG. 4C during which further basic periods the respective time interval $t_{on}$ is shifted in the direction of time interval $t_1$.

The total period $T_2$ has a duration composed of the duration of the individual basic periods T.

For controlling the color locus of the mixed-colored light, a reference table preferably forms the calculation basis for the duty ratios of the modified PWM signals $I_R, I_G, I_B$ with which the red, green and blue LEDS R, G, B of a group are driven. The reference table contains the brightness values—required for a desired color locus—of the different colors, for example of the red, green and blue LEDs R, G, B. The duty ratio dc for the respective modified PWM signal $I_R, I_G, I_B$ is calculated with the respective table value according to the following formula:

$$dc = \text{table value}/(\text{measured value for a color} - k*\text{background brightness})$$

where the influence of the background brightness on the control of the light source can be weighted by means of the choice of the factor k. If k is zero, then the measured value of a color supplies the illumination characteristic. If k has a magnitude greater than 1, then the brightness of the LEDs can be tracked with the ambient light such that for example a display comprising such a light source adapts its brightness to that of the ambient brightness. The sign of the factor k determines whether the light source becomes darker or brighter with brighter background light.

Furthermore, with the aid of a correction factor dependent on the duty ratio, the brightness of the LEDs 1 can be adapted if the latter do not have a constant brightness, for example on account of the heat arising during operation.

The brightness of the light source 10 can be reduced or increased for example by means of a linear scaling of the values of the reference table, if appropriate on the basis of the nonlinear characteristics of the color receptors of the eye.

The invention is not restricted by the description on the basis of the exemplary embodiments. But rather, the invention encompasses any new feature and also any combination of features, which in particular comprises any combination of features in the patent claims, even if this feature or this combination itself is not explicitly specified in the patent claims or exemplary embodiments.

In particular, the invention is not restricted to the use of LEDs as primary light sources or to light sources emitting red, green and blue light rather it is also possible to use other light sources as primary light sources and also primary light sources of other colors according to the invention.

What is claimed is:

1. A method for controlling the color locus of a light source (10) emitting mixed-colored light containing light of at least two different colors which is emitted by a plurality of primary light sources comprising:
dividing the primary light sources into groups,
determining and controlling the brightness values of the primary light sources within a group separately according to colors, such that the color locus of the mixed-colored light lies in a predetermined region of the CIE Standard chromaticity diagram, wherein the brightness values of the primary light sources are determined and controlled by:
setting the brightness of the primary light source using pulse-width-modulated signals which are switched on with a fixed basic period for a specific length of time;
phase-shifting the first switch-on time of the primary light source of a first color relative to the switch-on time of the remaining colors such that only the primary light sources of the first color are switched-on during a first time interval, wherein the phase-shifting of the first switch-on time of the primary light source of a first color is distributed over a plurality of basic periods, the plurality of basic periods continuing until the beginning of the first switch-on time is substantially congruent with the beginning of the first time interval; and
at least partially overlapping the switch-on times of all of the primary light sources of the light source in a second time interval which is adjacent to the first time interval.

2. The method as claimed in claim 1, wherein the primary light sources of a group are selected with respect to one another such that the brightness values of their light are within a predetermined range.

3. The method as claimed in claim 1, wherein the primary light sources of a color within a group are selected with respect to one another such that the dominant wavelengths of their light lie within a predetermined range.

4. The method as claimed in claim 1, wherein semiconductor light emitting diodes (LEDs), organic light emitting diodes (OLEDs), lasers or electroluminescent films are used as primary light sources.

5. The method as claimed in claim 1, wherein the primary light sources of a color within a group are driven with a respective pulse-width-modulated signal having a modified basic period such that only the primary light sources of one color are switched on during a first time interval of the basic period, and the brightness value of said color is determined during the first time interval ($t_1$).

6. The method as claimed in claim 5, wherein a total period of the pulse-width-modulated signal contains at least one basic period modified such that no primary light source of a group is switched on within a time interval of the basic period and the brightness value of the background light is determined within the time interval.

7. The method as claimed in claim 1, wherein the brightness values are determined by means of a sensor, the sensitivity of which is adapted to the sensitivity of the human eye.

8. The method as claimed in claim 1, wherein a photodiode is used for determining the brightness values.

9. The method as claimed in claim 1, wherein the brightness values of the primary light sources of a color within a group are determined sequentially with the aid of a photodiode.

10. The method as claimed in claim 1, wherein the brightness values of the primary light sources of a color within a group are corrected by a background brightness.

11. The method as claimed in claim 1, wherein the light source emits mixed-colored light comprising the colors red, green and blue.

12. The method as claimed in claim 1, wherein the mixed-colored light has a color locus in the white region of the CIE standard chromaticity diagram.

13. A light source emitting mixed-colored light containing light of at least two different colors which is emitted by a plurality of primary light sources wherein:
the primary light sources are divided into groups, and the brightness values of the primary light sources within a group are determined and controlled separately according to colors, such that the color locus of the mixed-colored light lies in a predetermined region of the CIE Standard chromaticity diagram;
the brightness of the primary light source are set using pulse-width-modulated signals which are switched on with a fixed basic period for a specific length of time;
the first switch-on time of the primary light source of a first color are phase-shifted relative to the switch-on time of the remaining colors such that only the primary light sources of the first color are switched-on during a first time interval, wherein the phase-shifting of the first switch-on time of the primary light source of a first color is distributed over a plurality of basic periods, the plurality of basic continuing until the be inning of the first switch-on time is substantially congruent with the beginning of the first time interval; and
the switch-on times of all of the primary light sources of the light source at least partially overlap in a second time interval which is adjacent to the first time interval.

14. The light source as claimed in claim 13, wherein the primary light sources of a color within a group are selected with respect to one another such that the brightness values of their light are within a predetermined range.

15. The light source as claimed in claim 13, wherein the primary light sources of a color within a group are selected with respect to one another such that the dominant wavelengths of their light lie within a predetermined range.

16. The light source as claimed in claim 13, which has semiconductor light emitting diodes (LEDs), organic light emitting diodes (OLEDs), lasers or electroluminescent films as primary light sources.

17. The light source as claimed in claim 13, which comprises a sensor, the sensitivity of which is adapted to the sensitivity of the human eye, for determining the brightness values.

18. The light source as claimed in claim 13, which comprises a photodiode for determining the brightness values.

19. The light source as claimed in claim 13 which emits mixed-colored light comprising red, green and blue light.

20. The light source as claimed in claim 13, which emits mixed-colored light having a color locus in the white region of the CIE Standard chromaticity diagram.

21. An illumination device for backlighting a display comprising a light source as claimed in claim 13.

* * * * *